United States Patent [19]

Takasaki et al.

[11] Patent Number: 5,134,572
[45] Date of Patent: Jul. 28, 1992

[54] PARTITIONED IMAGE PROCESSING SYSTEM FOR AN IMAGE PROCESSING DEVICE

[75] Inventors: Naruto Takasaki, Kawasaki; Hitoshi Inubushi, Tokyo; Yutaka Tanaka, Yokohama, all of Japan

[73] Assignee: Hitachi Software Engineering Co., Ltd., Yokohama, Japan

[21] Appl. No.: 272,826

[22] Filed: Nov. 18, 1988

[30] Foreign Application Priority Data

Nov. 20, 1987 [JP] Japan .................. 62-293738

[51] Int. Cl.⁵ .......................... G06F 3/155
[52] U.S. Cl. .................. 395/160; 340/747; 395/135
[58] Field of Search ............... 364/518, 521, 522; 340/747, 750, 734; 382/9, 48

[56] References Cited

U.S. PATENT DOCUMENTS

| | | | |
|---|---|---|---|
| 4,503,556 | 3/1985 | Scherl et al. | 382/9 |
| 4,571,684 | 2/1986 | Takamabe et al. | 364/449 |
| 4,653,012 | 3/1987 | Duffy et al. | 364/518 |
| 4,789,855 | 12/1988 | Ozeki | 340/703 |
| 4,847,788 | 7/1989 | Shimada | 364/522 |
| 4,873,585 | 10/1989 | Blanton et al. | 358/335 |

Primary Examiner—Gary V. Harkcom
Assistant Examiner—Phu K. Nguyen
Attorney, Agent, or Firm—Fay, Sharpe, Beall, Fagan, Minnich & McKee

[57] ABSTRACT

A partitioned image processing device executes image processing of large size drawing data using an image memory of small capacity to provide substantially the same processed result as that obtainable by using an image memory with a large memory capacity. An image data input device for inputting the image data; an image memory for storing the image data; and an image processing device for performing the image processing of the image data read in the image memory are provided. The image processing device is designed to partition the image data read-in from the image memory into partitioned regions; to read the partitioned regions of the image data in the image memory so that the portions of the image data in the adjacent partitioned regions partly overlap with each other, and to execute the image processing of each of the partitioned regions.

4 Claims, 6 Drawing Sheets

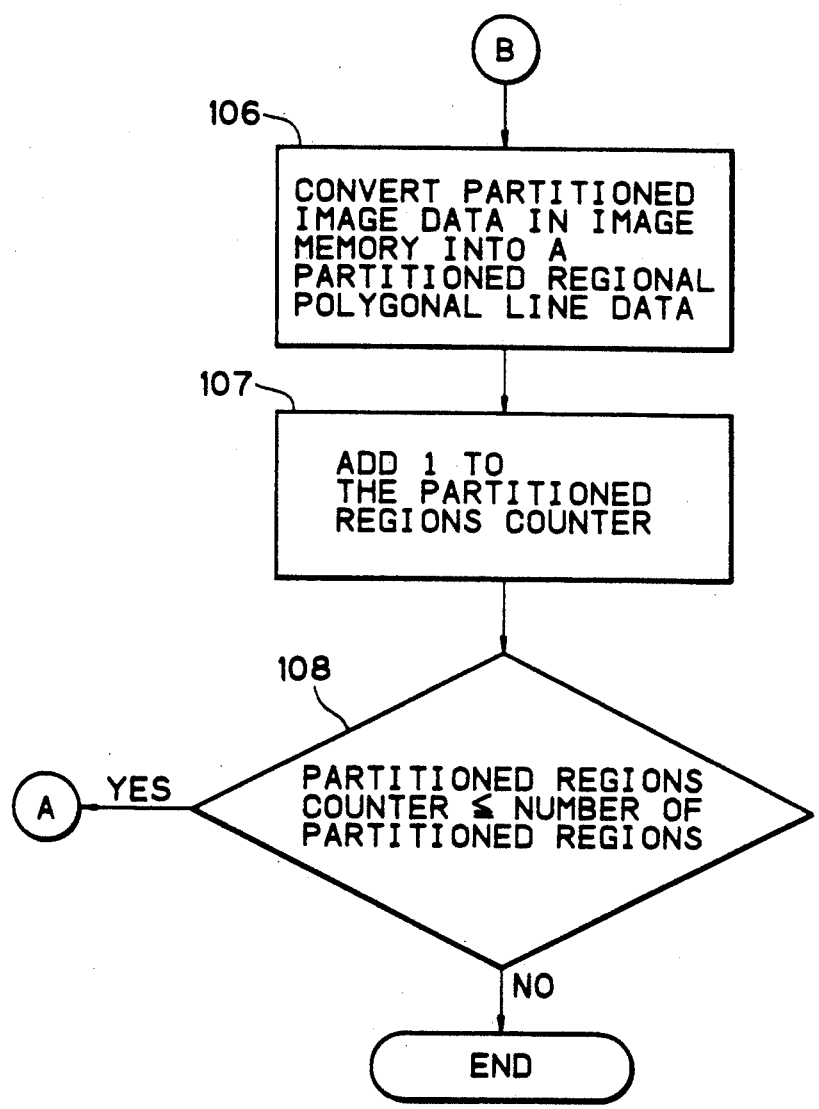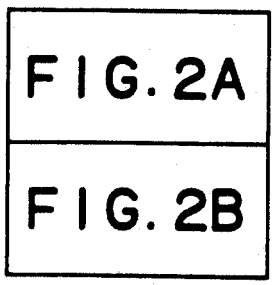

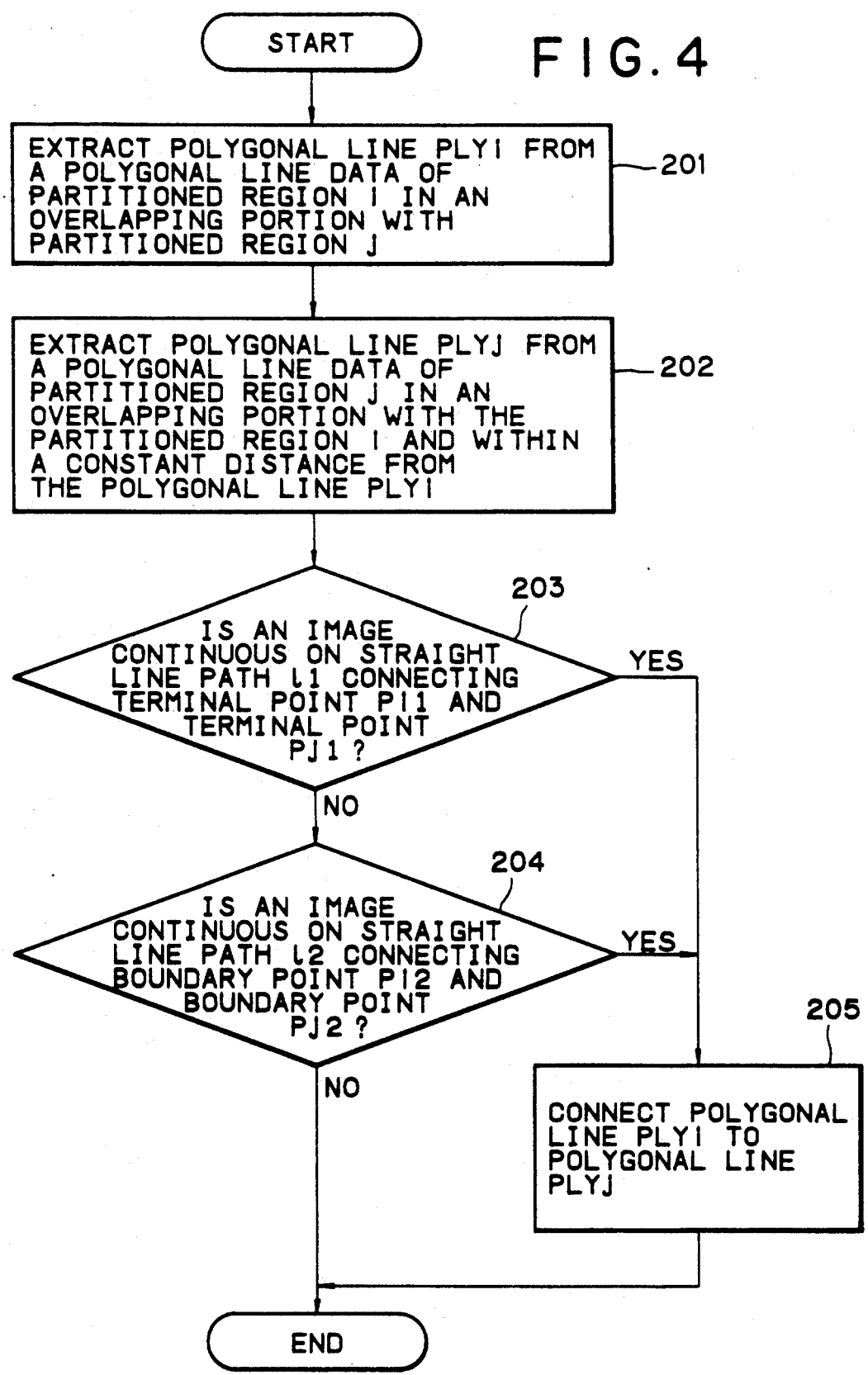

PARTITIONED IMAGE PROCESSING SYSTEM FOR AN IMAGE PROCESSING DEVICE

BACKGROUND OF THE INVENTION

The present invention relates to a partitioned image processing system for processing image data in an image processing device and, more particularly, to a partitioned image processing system which permits the image processing of a large region by partitioning the image data, processing the partitioned image data, and subjecting the image data in the partitioned regions to connection processing to connect the partitioned regions.

Heretofore, image processing devices such as computer aided design apparatuses are designed so as to extract various shapes from a drawing in which various line segments are present and to classify them into line drawing elements when drawing data is processed by digitizing a line drawing. As a pre-processing of the image processing at this time, the image data is processed for conversion into polygonal line data. More specifically, when line drawing data is read by a scanner and input in a image data file, the image data input in the image data file is stored in an image memory in a processing unit, thus processing for converting the image data into the polygonal line data.

As technology advances to a high degree, a line drawing sought to be processed by image processing devices such as computer aided design apparatuses becomes lager and larger so that such image processing devices have been desired to have a capacity for processing a large scale of drawing data.

It is to be noted, however, that there is a limit upon the memory capacity of an image memory in a processing unit of image processing devices, thus leading to a limit upon a size of a drawing that can be processed by reading in the image memory at the same time. For instance, in executing the polygonal line processing for converting image data of a line drawing into polygonal line data, a large number of the image data to be converted into the polygonal line data should be stored in an image memory of the processing unit and processed at the same time. However, an amount of the image data which can be subjected to the polygonal line processing is also restricted so that the image memory should be provided with a memory capacity in accordance with such a large amount of the image data when the image data to be processed into a polygonal line data is rendered large. Thus this presents the problem that the data of a large drawing cannot be subjected to the image processing.

SUMMARY OF THE INVENTION

An object of the present invention is to provide a partitioned image processing system capable of image processing large scale drawing data using an image memory with a small memory capacity.

Another object of the present invention is to provide a partitioned image processing system capable of producing substantially the same processing result as that obtained by the processing using an image memory with a large memory capacity as well as being capable of image processing large scale drawing data using an image memory with a small memory capacity.

In order to achieve the above objects, the image processing device in accordance with the present invention is provided with an image data input means for inputting an image data, a memory means for storing the image data, an image memory, and an image processing means for image processing the image data read in the image memory. The image processing means is designed to partition the image data from the memory means into partitioned regions to read the image data in the image memory in such so that portions of the image data in adjacent partitioned regions overlap with each other, and to image process each of the partitioned regions.

The image processing means is further designed to execute a connection processing of the partitioned regions for the image-processed image data for each of the partitioned regions on the basis of the image data present in an overlapping portion of the adjacent partitioned regions.

Furthermore, the image processing means is designed to execute the polygonal line processing for converting the image data into polygonal line data, to select from the polygonal lines one polygonal line located closely to an overlapping portion of another polygonal line in order on the basis of the polygonal line data in the overlapping portion of the adjacent partitioned regions, to judge whether each of the images corresponding to the two polygonal lines in the overlapping portion is continuous or not, to judge whether the two polygonal lines can be connected to each other or not, and to execute the connection processing of the corresponding partitioned regions.

More specifically, when the image data of a large size of drawing data is provided to the image processing device, the image data is partitioned into a predetermined number of partitioned regions which is then read in the image memory. The reading in the image memory is executed in such a state that a portion of the image data in a first partitioned region overlaps with a portion of the image data in a second partitioned region adjacent to the first partitioned region, thus allowing the image processing means to image process each of the partitioned regions. The image data which has been image processed for each of the partitioned regions is then subjected to the connection processing of the partitioned regions on the basis of the image data in the overlapping portion of the adjacent partitioned regions.

This permits the image processing of a large size of drawing data with an image memory of a small capacity and provides substantially the same processing result as that obtained by the processing using an image memory with a large memory capacity.

When the image processing to be executed is the polygonal line processing for converting the image data into a polygonal line data, the polygonal line processing involves partitioning the image data into partitioned regions in such a manner that portions of the image data in the adjacent partitioned regions overlap with each other, storing the image data of each of the partitioned regions in order in an image memory, and converting the stored image data into the polygonal line data. Thereafter, polygonal lines present within a close distance in the overlapping portion of the adjacent partitioned regions are selected one by one in the order as an object for connection with the polygonal lines of the polygonal line data in the adjacent partitioned regions. Then the two polygonal lines are judged to determine whether each of the images corresponding to them is continuous in the overlapping portion. The corresponding partitioned regions are then subjected to the connection processing, thus connecting a set of correct polygonal lines between the partitioned regions and converting the image data as a whole to polygonal line data.

As described hereinabove, the partitioned image processing system for the image processing device in accordance with the present invention permits a conversion of given image data into polygonal line data for each of the partitioned regions merely by providing the image processing device with an image memory corresponding in size to one partitioned region, even if a large size drawing data is given. Furthermore, the partitioned regions processing system according to the present invention permits an accurate connection processing of the polygonal line data for each of partitioned regions at an overlapping portion of the adjacent partitioned regions.

BRIEF DESCRIPTION OF THE DRAWINGS

Other objects and features of the present invention will become apparent in the course of the description of the following preferred embodiments with reference to the drawings.

FIG. 2, which comprises FIGS. 2A and 2B, is a flowchart showing a processing flow of the partitioned region processing.

FIG. 4 is a flow chart showing one example of processing flows of the connection processing for connecting adjacent partitioned-regional polygonal line data.

DETAILED DESCRIPTION OF THE PREFERRED EMBODIMENTS

Figure 1:
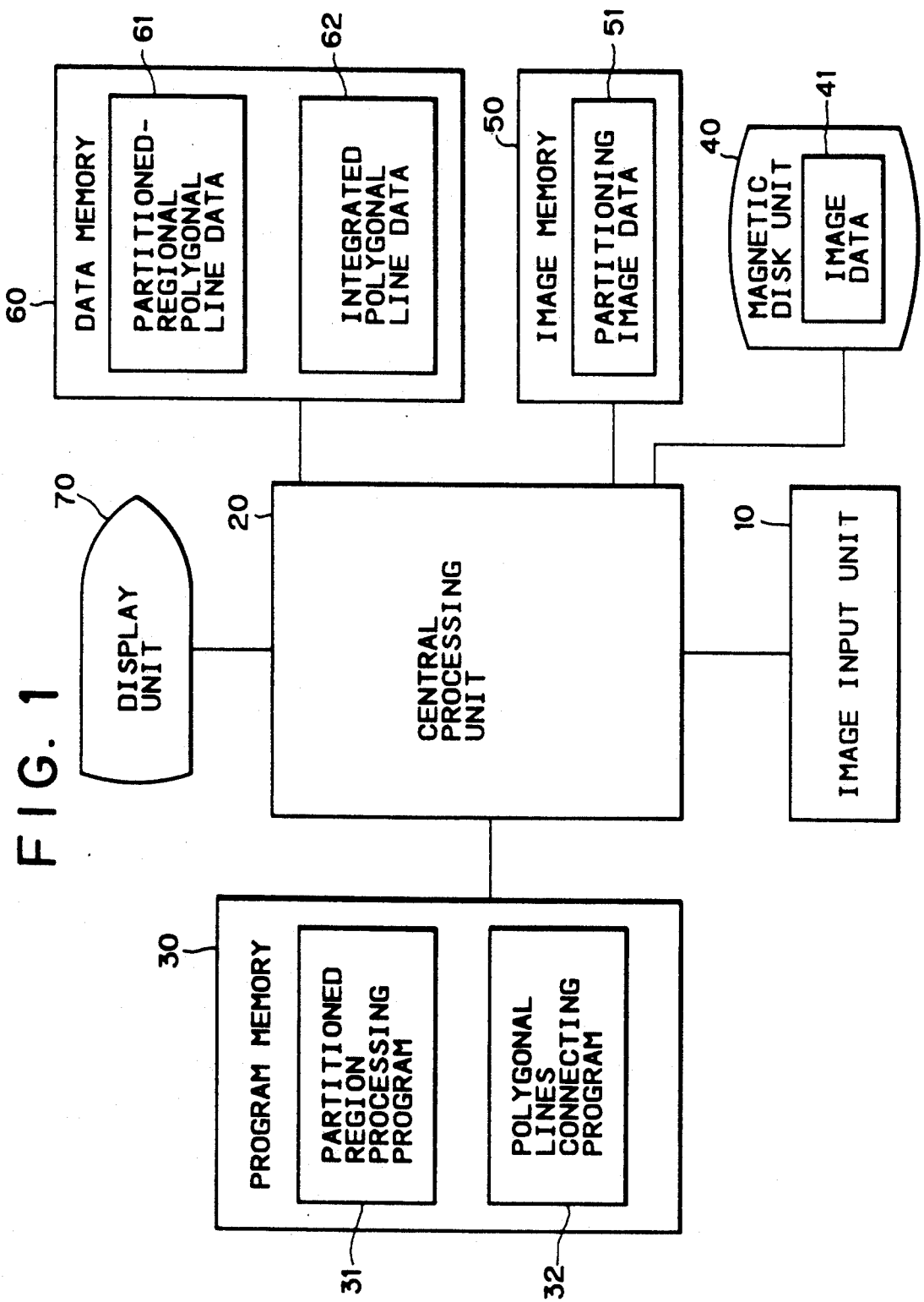
FIG. 1 is a block diagram showing a construction of one example of the image processing device according to the present invention.

FIG. 1 shows one example of the image processing device according to the present invention, which comprises an image input unit 10 for inputting an image, a central processing unit 20 for executing various processings, a program memory 30 for storing a program necessary for the processing with the central processing unit 20, a magnetic disk unit 40 for storing an image data 41 input from the image input unit 10, an image memory 50 for storing a the partitioning image data 51 for each of partitioned regions, a data memory 60 for storing a partitioned-regional polygonal line data 61 as a processing result obtained by the polygonal line processing of the partitioning image data 51 and an integrated polygonal line data 62, and a display unit 70 for displaying data such as the integrated polygonal line data 62 and the like.

The program memory 30 is designed so as to store a partitioned region processing memory 31 for converting the image data 41 into polygonal line data for each of the partitioned regions, and a polygonal lines connecting program 32 for preparing the integrated polygonal line data 62 by connecting the polygonal line data for each of the partitioned regions. The central processing unit 20 is designed so as to extract data for each of the partitioned regions from the image data 41 in the magnetic disk unit 40, to store the extracted data as the partitioned image data 51 in the image memory 50, and to execute the polygonal line processing to convert the image data into the partitioned-regional polygonal line data 61, on the basis of the partitioned region processing program 31 in the program memory 30. In this processing, the partitioning image data 51 is obtained by partitioning the image data 41 into each of the partitioned regions in such a state that portions of the image data overlap with each other in the adjacent partitioned regions, and the partitioning image data 51 is stored in the image memory 50 for each of the partitioned regions. Then the partitioning image data 51 is subjected to the polygonal line processing for each of the partitioned regions and converted into polygonal line data, thus leading to the partitioned-regional polygonal line data 61 which in turn is stored in the data memory 60. Thereafter, the central processing unit 20 integrates the partitioned-regional polygonal line data 61 in the data memory 60 into one integrated polygonal line data 62 on the basis of the polygonal lines connecting program 32 in the program memory 30, and displays the integrated polygonal line data 62 on the display unit 70.

Figure 2A:
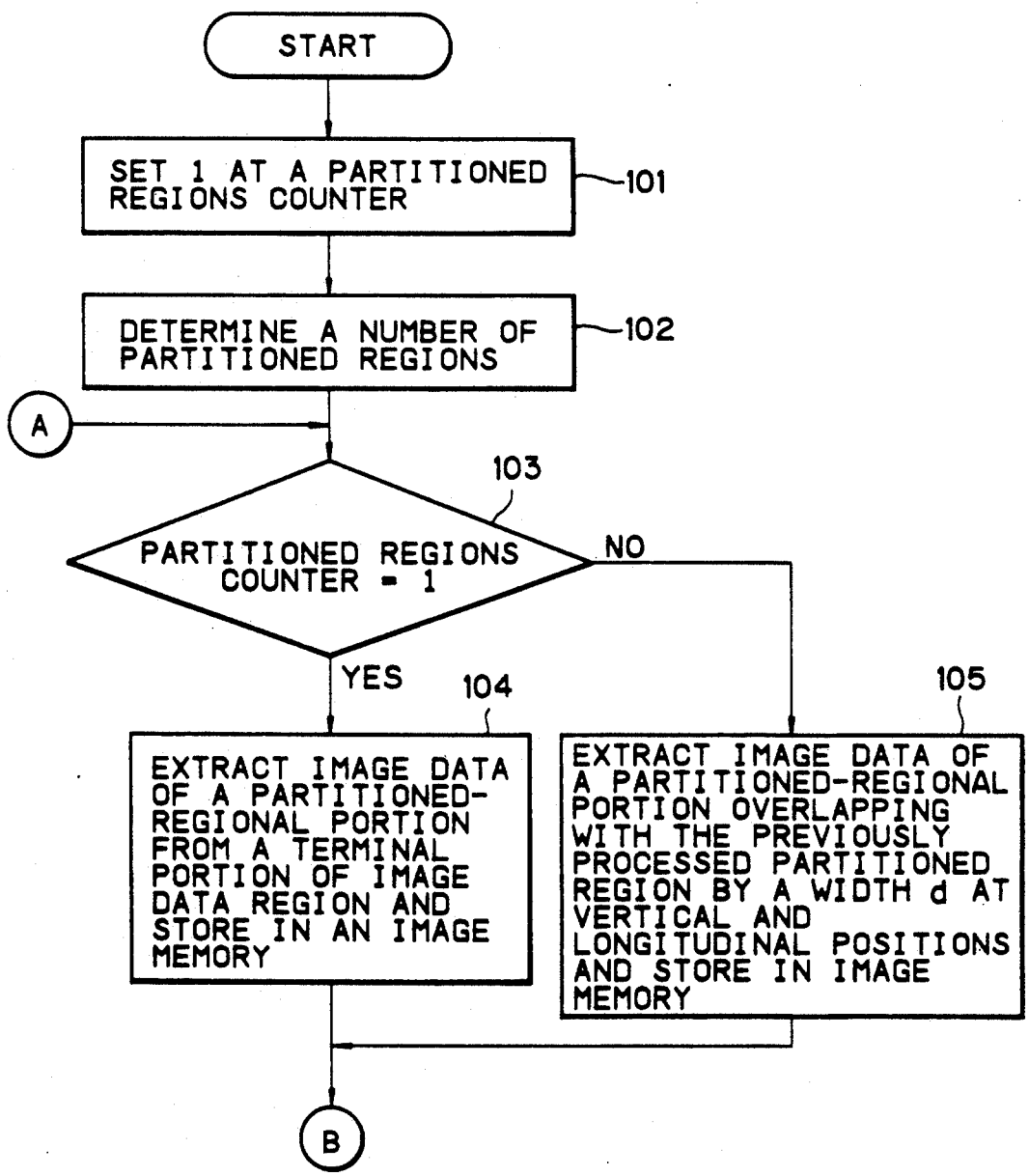
Figure 3:
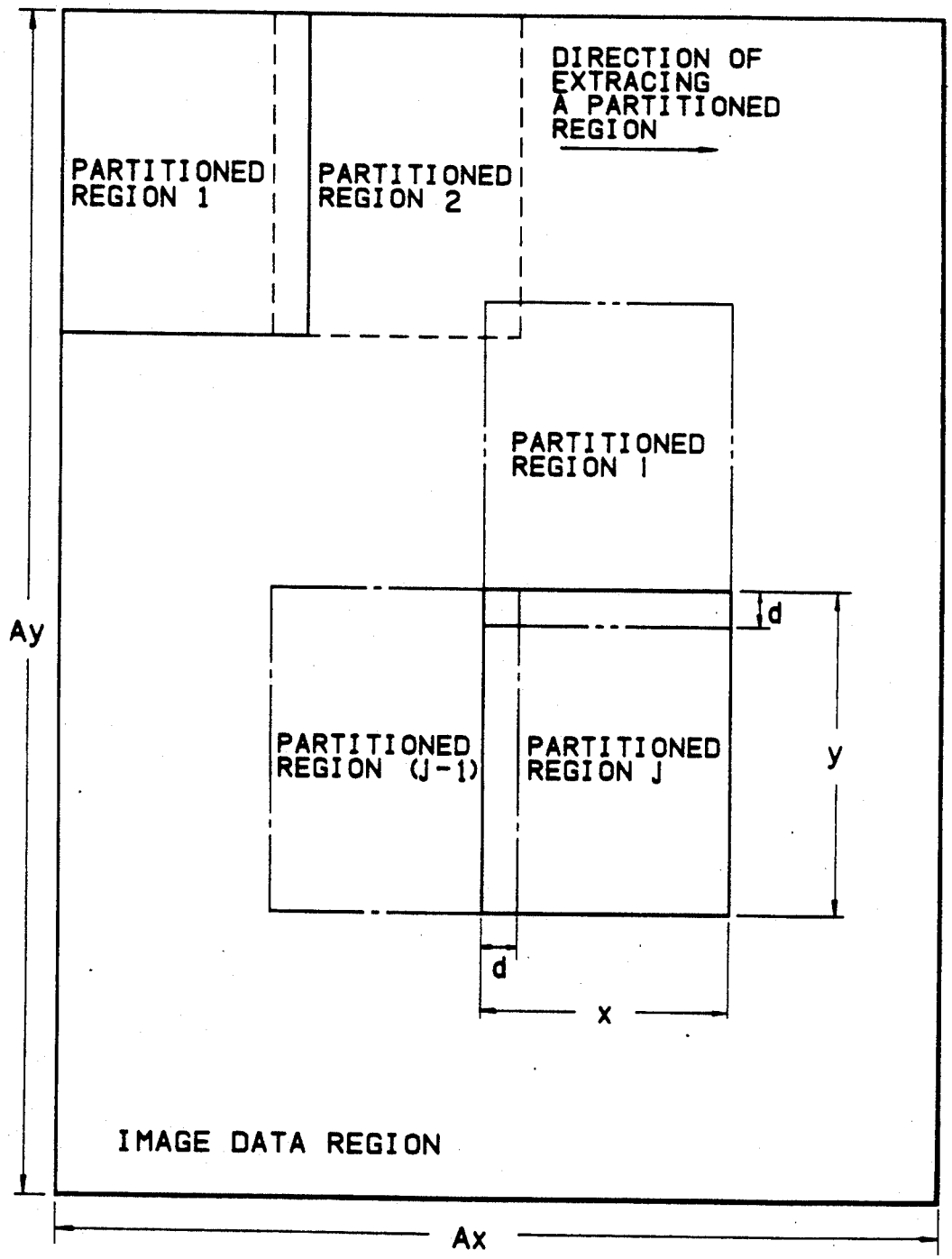
FIG. 3 is an explanation diagram for explaining operation of the processing of a regional partitioning.

FIG. 2 shows a flowchart showing the processing flow of the partitioned region processing. FIG. 3 shows a diagram for explaining the operation of the partitioned region processing. The partitioned region processing will be described in accordance with FIG. 2 with reference to FIG. 3.

It is presumed in the following description that the image data 41 is in the magnetic disk unit 40. In extracting the partitioned image data 51 for each of the partitioned regions from the image data 41 to provide the partitioned-regional polygonal line data 61, first at step 101, a partitioned regions counter is set at 1. Then at step 102, as shown in FIG. 3, a number of regions to be partitioned is determined from a size of a given image data region (Ax x Ay), a size of a partitioned region portion (x x y), and a width d of an overlapping portion of the partitioned regions. And in the processing from step 103, the image data is partitioned into a predetermined number of partitioned regions which is then subjected to the partitioned region processing for conversion into polygonal line data.

At step 103, it is judged whether or not the partitioned region counter is set at 1. If the counter is set at 1, on the one hand, the flow proceeds to step 104 and an image data of the partitioned region portion (x x y) is extracted from a terminal portion of the given image data region (Ax x Ay) of the image data 41 in the magnetic disk unit 40. If the counter is not set at 1, on the other hand, the flow proceeds to step 105 where there is extracted an image data of the partitioned region portion (x x y) in such a manner as overlapping with the previously processed partitioned region by a width d at vertical and longitudinal portions, and the image data thereof is stored in the image memory as a partitioned image data 51 for the next partitioned region i(i=1, 2, . . . ). At step 106, the partitioned image data 51 for the partitioned region i stored in the image memory 50 is then converted into a partitioned-regional polygonal line data 61 which in turn is stored in the data memory 60. Then at step 107, value 1 is added to the number set at the partitioned regions counter, and at step 108, it is judged whether or not the number at the partitioned regions counter is equal to or smaller than a number of partitioned regions determined at the step 102. If the number at the partitioned regions counter is equal to or smaller than the determined number, on the one hand, the flow returns to the step 103 and the partitioned region processing from the step 103 is repeated. If the number of the partitioned regions counter exceeds the determined number of the partitioned regions at the step 108, on the other hand, the partitioned region processing concludes.

As the image data 41 in the magnetic disk unit 40 is partitioned, each of the partitioned regions is stored in the image memory 50 as the partitioned image data 51 which in turn is subjected to the polygonal line processing for conversion into a polygonal line data, and the polygonal line data present in an overlapping portion of the adjacent partitioned regions is stored in the data memory 60 as the partitioned-regional polygonal line data 61.

Then the partitioned-regional polygonal line data 61 obtained hereinabove is processed to provide the integrated polygonal line data 62 using the polygonal lines connecting program 32.

Figure 5A:
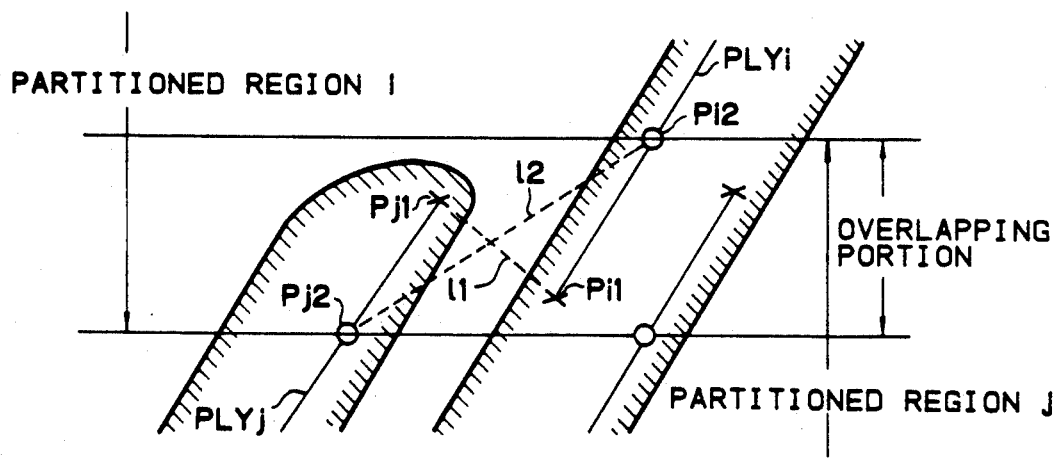
FIGS. 5a and 5b are each an explanation diagram showing the principle for judging whether to connect polygonal lines between the partitioned-regional polygonal line data.
Figure 5B:
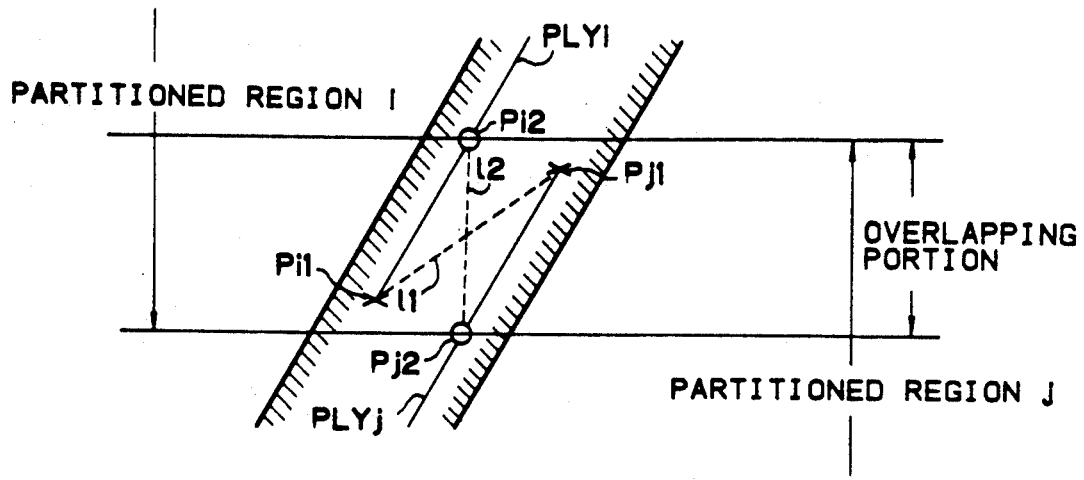

FIG. 4 shows a flowchart illustrating one example of processing flow for the connection processing for connecting adjacent partitioned-regional polygonal line data 61. FIGS. 5a and 5b are diagrams for explaining the principle of judging whether or not the polygonal lines in the partitioned-regional polygonal line data can be connected to each other. A manner of the connection processing will be described in accordance with FIGS. 5a and 5b in conjunction with FIG. 4.

The following is a description of the processing for integrating the partitioned-regional polygonal line data obtained by the above-mentioned partitioned region processing into the integrated polygonal line data 62 by taking an example that two polygonal lines PLYi and PLYj are connected to each other, which are located at a distance close to each other in an overlapping portion of two adjacent partitioned regions i and j, respectively.

First at step 201, the polygonal line PLYi is extracted from the polygonal line data of the partitioned region i in a portion in which the partitioned region i overlaps with the partitioned region j. Then at step 202, the polygonal line PLYj is extracted from the polygonal line data of the partitioned region j, which is located in such a portion as overlapping with the partitioned region i and in a constant distance from the polygonal line PLYi. Thereafter, at step 203, it is judged whether or not an image for each of the extracted polygonal lines PLYi and PLYj is continuous on a straight line path l 1 connecting a terminal point Pi1 for the polygonal line PLYi and a terminal point Pj1 for the polygonal line PLYj. If the image is judged to be continuous, on the one hand, the flow proceeds to step 205 and the two polygonal lines PLYi and PLYj are connected to each other. If the image is judged to be discontinuous, on the other hand, the flow advances to step 204 where an image for each of the polygonal lines PLYi and PLYj is continuous on a straight line path l 2 connecting boundary points Pi2 and Pj2 in the overlapping portion of the partitioned regions i and j, respectively. If the image is judged to be continuous, on the one hand, the flow proceeds to step 205 and the two polygonal lines PLYi and PLYj are connected to each other. If the image is judged to be discontinuous, on the other, it is found that the polygonal line PLYi cannot be connected to the polygonal line PLYj so that the processing concludes without connection.

This polygonal lines connecting processing is repeatedly executed until it is judged whether all of the polygonal lines located in the partitioned region i and within a constant distance from the polygonal line PLYj in the partitioned region j have been considered, and this processing is repeated until no polygonal lines sought to be connected are present any more.

As described hereinabove, in this embodiment, the partitioned region processing provides a polygonal line data as a processing result in substantially the same manner as that obtained by the processing for providing a polygonal line data in a large region, extracting the image data for each of the partitioned regions in the image memory in such a manner that they overlap with each other, converting the image data into the polygonal line data, and connecting a set of correct continuous polygonal lines between the partitioned regions by means of the connection processing of the polygonal line data between the partitioned regions. In other words, in this embodiment, when given image data is converted into polygonal line data, however large the given image data is, it is sufficient that the image memory in the image processing device according to the present invention have a memory capacity corresponding merely to a size of one partitioned region. This permits the image processing for converting image data of a large drawing data into a polygonal line data.

As described hereinabove, in the image processing device according to the present invention, for example, when the image processing is executed for converting the image data into the polygonal line data, the image data is partitioned into partitioned regions in such a manner that each of the partitioned regions overlaps with another partitioned region adjacent to it. The image processing of the image data is executed for each of the partitioned regions, and then the connection processing is implemented for connecting the results between the adjacent partitioned regions. Accordingly, however large the given image data is the image processing device according to the present invention permits the image processing if it is provided with an image memory that merely corresponds in size to a size of one partitioned region. Furthermore, the partitioned region is provided with a portion overlapping a partitioned region adjacent to the one partitioned region so that the connection processing of the partitioned regions is ensured. For instance, the connection processing of the polygonal line data permits the connection of the polygonal lines while looking at a state of connection of the image corresponding to the polygonal lines so that the connection processing can be implemented to provide an accurate polygonal line.

What is claimed is:

1. A partitioned image processing method for partitioning image data of an entire region into image data of a plurality of partitioned regions, and converting the partitioned image data into polygonal line data, comprising the steps of:

inputting image data for an entire region by an image input unit, storing the input image data for the entire region in a storage unit, determining partitioned regions into which the image data for the entire region stored in the storage unit is partitioned, reading the image data of a partitioned region to be subjected to image processing from the image memory so that the image data of the partitioned region overlaps partly with the image data of adjacent partitioned regions which have already been subjected to image processing, and executing polygonal line processing as the image processing of the partitioned image data read from the image memory, said reading and said polygonal line processing being repeated in order for each partitioned region, to obtain partitioned region polygonal line data for each of the partitioned regions;

generating integrated polygonal line data for the image data of the entire region by executing connecting processing for connecting the polygonal line data between adjacent partitioned regions to each other, using the polygonal line data in the respective overlapping portions of adjacent partitioned regions;

wherein the connecting processing includes the steps of selecting the data of one polygonal line for each of two partitioned regions adjacent to each other from the polygonal line data in the overlapping portion of two overlapping partitioned regions, judging whether or not the image data in the overlapping portion are continuous on a straight line connecting respective points of the data of the two selected polygonal lines with respect to each other, and connecting the selected data of the two polygonal lines to each other when the image data are continuous.

2. A partitioned image processing system for an image processing device for reading partitioned image data from an image memory, and executing image processing of the partitioned image data read from the image memory, comprising:

an image input unit for inputting image data for an entire region;

a storage unit for storing the image data for the entire region;

an image memory for storing image data for a partitioned region derived from the entire region, wherein the partitioned region is to be subjected to image processing;

a processing unit having means for determining partitioned regions by partitioning the image data for the entire region stored in the storage unit, means for reading image data for a partitioned region from the image memory so that the image data for the partitioned region overlaps partly with the image data for adjacent partitioned regions which have been already subjected to image processing by the processing unit, and means for executing image processing of the thus-read image data for the partitioned region, said reading performed by said reading means and said image processing executed by said image processing means, respectively, being repeated in order for each partitioned region;

wherein the image processing means converts the image data into polygonal line data;

wherein the processing unit further includes means for executing connection processing for connecting two adjacent partitioned regions which have already been subjected to the polygonal line processing, by using the polygonal line data in the overlapping portion of the two partitioned regions; and wherein the connection processing means executes the connection processing by selecting the data of one polygonal line for each of the two partitioned regions adjacent to each other from the polygonal line data in the overlapping portion of the two partitioned regions, by judging whether or not the image data in the overlapping portion is continuous on a straight line connecting respective points of the data of the two selected polygonal lines with respect to each other, and further by connecting the selected data of the two polygonal lines to each other when the image data is continuous.

3. A partitioned image processing system for an image processing device for reading partitioned image data from an image memory, and executing image processing of the partitioned image data read from the image memory, comprising:

an image input unit for inputting image data for an entire region;

a storage unit for storing the image data for the entire region;

an image memory for storing image data for a partitioned region derived from the entire region, wherein the partitioned region is to be subjected to image processing;

a processing unit having means for determining partitioned regions by partitioning the image data for the entire region stored in the storage unit, means for reading image data for a partitioned region from the image memory so that the image data for the partitioned region overlaps partly with the image data for adjacent partitioned regions which have been already subjected to image processing by the processing unit, and means for executing image processing of the thus-read image data for the partitioned region, said reading performed by said reading means and said image processing executed by said image processing means, respectively, being repeated in order for each partitioned region;

wherein the image processing means converts the image data into polygonal line data;

wherein the processing unit further includes means for executing connection processing for connecting two adjacent partitioned regions which have already been subjected to the polygonal line processing, by using the polygonal line data in the overlapping portion of the two partitioned regions; and wherein the connection processing means further executes the connection processing by selecting the data of one polygonal line present in the overlapping portion of each of the two partitioned regions adjacent to each other, by obtaining a first straight line connecting the terminal points of the selected polygonal lines in the overlapping portion, by judging whether or not each of the image data in the overlapping portion is continuous on the first straight line, and by connecting the selected data of the two polygonal lines to each other when the image data is continuous.

4. A partitioned image processing system for an image processing device for reading partitioned image data from an image memory, and executing image processing of the partitioned image data read from the image memory, comprising:

an image input unit for inputting image data for an entire region;

a storage unit for storing the image data for the entire region;

an image memory for storing image data for a partitioned region derived from the entire region, wherein the partitioned region is to be subjected to image processing;

a processing unit having means for determining partitioned regions by partitioning the image data for the entire region stored in the storage unit, means for reading image data for a partitioned region from the image memory so that the image data for the partitioned region overlaps partly with the image data for adjacent partitioned regions which have been already subjected to image processing by the processing unit, and means for executing image processing of the thus-read image data for the partitioned region, said reading performed by said reading means and said image processing executed by said image processing means, respectively, being repeated in order for each partitioned region;

wherein the image processing means converts the image data into polygonal line data;

wherein the processing unit further includes means for executing connection processing for connecting two adjacent partitioned regions which have already been subjected to the polygonal line processing, by using the polygonal line data in the overlapping portion of the two partitioned regions; and wherein the connection processing means executes the connection processing by selecting the data of one polygonal line present in the overlapping portion of each of the two partitioned regions adjacent to each other, by obtaining a first straight line connecting the end points of the selected polygonal lines in the overlapping portion and a second straight line connecting the boundary points of the selected polygonal lines to each other, by judging whether or not the image data in the overlapping portion is continuous both on the first straight line and on the second straight line, and by connecting the selected data of the two polygonal lines to each other when the image data is continuous.

* * * * *